(12) United States Patent
Cooper et al.

(10) Patent No.: US 12,134,213 B2
(45) Date of Patent: Nov. 5, 2024

(54) PROCESS FOR FORMING A ROTATIONAL MOLDED ARTICLE

(71) Applicant: Dow Global Technologies LLC, Midland, MI (US)

(72) Inventors: Russell T. Cooper, Freeport, TX (US); Kumar N. Sanketh, Freeport, TX (US); Yi Fan, Midland, MI (US); Matthew Bishop, Midland, MI (US); Craig F. Gorin, Midland, MI (US); Daniel L Dermody, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1028 days.

(21) Appl. No.: 16/982,357

(22) PCT Filed: Mar. 15, 2019

(86) PCT No.: PCT/US2019/022470
§ 371 (c)(1),
(2) Date: Sep. 18, 2020

(87) PCT Pub. No.: WO2019/182893
PCT Pub. Date: Sep. 26, 2019

(65) Prior Publication Data
US 2021/0031414 A1    Feb. 4, 2021

Related U.S. Application Data

(60) Provisional application No. 62/646,671, filed on Mar. 22, 2018.

(51) Int. Cl.
| B29C 41/00 | (2006.01) |
| B29C 41/06 | (2006.01) |
| C08L 23/08 | (2006.01) |
| B29K 23/00 | (2006.01) |
| B29K 105/00 | (2006.01) |

(52) U.S. Cl.
CPC ............ B29C 41/003 (2013.01); B29C 41/06 (2013.01); C08L 23/0815 (2013.01); *B29K 2023/08* (2013.01); *B29K 2105/251* (2013.01); *C08L 2205/025* (2013.01)

(58) Field of Classification Search
CPC .... B29C 41/003; B29C 41/06; C08L 23/0815
USPC ........................................................ 428/220
See application file for complete search history.

(56) References Cited

U.S. PATENT DOCUMENTS

| 3,542,912 A | 11/1970 | Rielly et al. |
| 4,419,408 A | 12/1983 | Schmukler et al. |
| 4,533,696 A | 8/1985 | Schrijver et al. |
| 4,537,836 A | 8/1985 | Adur et al. |
| 4,548,779 A | 10/1985 | Steinberg et al. |
| 5,336,731 A * | 8/1994 | Ondrus ...................... C08J 3/12 525/326.5 |
| 5,585,419 A | 12/1996 | Prout et al. |
| 5,677,383 A | 10/1997 | Chum et al. |
| 6,111,023 A | 8/2000 | Chum et al. |
| 6,984,695 B2 | 1/2006 | Brown et al. |
| 7,608,668 B2 | 10/2009 | Li Pi Shan et al. |
| 7,763,676 B2 * | 7/2010 | Moncla ..................... C08J 7/043 524/576 |
| 8,173,209 B2 | 5/2012 | Chereau et al. |
| 8,334,020 B2 | 12/2012 | Swabey |
| 8,674,027 B2 | 3/2014 | Krabbenborg |
| 2005/0271888 A1* | 12/2005 | Moncla .................. C09J 131/04 428/523 |
| 2006/0251835 A1 | 11/2006 | Maziers et al. |
| 2013/0011643 A1 | 1/2013 | Maziers et al. |
| 2013/0261282 A1 | 10/2013 | Biedasek et al. |
| 2016/0177075 A1* | 6/2016 | Crimmins ........... C08L 23/0815 523/221 |
| 2018/0044536 A1* | 2/2018 | Walia ......................... B01J 2/02 |

FOREIGN PATENT DOCUMENTS

| AU | 200048619 A * | 1/2001 |
| AU | 200048619 A1 | 1/2001 |
| AU | 764796 B2 | 8/2003 |
| FR | 2165780 A1 | 8/1973 |
| JP | 2001089615 A | 4/2001 |
| JP | 2010265443 A | 9/2013 |
| JP | 2010539289 A | 6/2014 |
| JP | 2016507145 A | 3/2016 |
| JP | 2016511788 A | 12/2018 |
| JP | 2017518417 A | 2/2020 |
| WO | 96/15892 A1 | 5/1996 |
| WO | 96/30180 A1 | 10/1996 |
| WO | 2015/130240 A1 | 9/2015 |
| WO | 2016/160228 A1 | 10/2016 |

* cited by examiner

*Primary Examiner* — Tahseen Khan
(74) *Attorney, Agent, or Firm* — Boyle Fredrickson, S.C.

(57) ABSTRACT

The present disclosure provides a process. The process includes providing a blend containing (A) a first powder including (i) a polyolefin having a density from 0.860 g/cc to 0.910 g/cc, and a melt index from 1.5 g/10 min to 1,000 g/10 min; (ii) from 1 wt % to 15 wt % of a dispersant selected from an acrylic dispersant, a poloxamer, and combinations thereof; and (iii) optionally, a polyolefin wax, the first powder having a mean volume average particle size from 1 µm to 300 µm; and (B) a second powder including an ethylene/α-olefin copolymer having (i) a density from 0.920 g/cc to 0.955 g/cc; and (ii) a melt index from 1.0 g/10 min to 15 g/10 min, the second powder having a mean volume average particle size from 325 µm to 4,000 µm; and rotational molding the blend to form a rotational molded article.

17 Claims, No Drawings

PROCESS FOR FORMING A ROTATIONAL MOLDED ARTICLE

BACKGROUND

The present disclosure relates to a process for forming a rotational molded article.

Many applications exist for rotational molded articles, including playground equipment, storage bins, refuse containers, automotive parts, toys, kayaks, furniture, and traffic barricades. A growing need exists for these rotational molded articles to have an outer surface that is modified to increase grip or slip resistance, increase impact resistance, and/or provide differentiated haptics. Rotational molded articles with a modified outer surface are conventionally produced by two-step process in which a first polymeric material is loaded into a rotational mold and rotationally molded, and then a second polymeric material is loaded into the same mold and rotationally molded. However, this two-step process can result in over-cooking of the first polymeric material and under-cooking of the second polymeric material. Another two-step process utilized to produce rotational molded articles with a modified outer surface includes (i) rotationally molding a first polymeric material into an article, and then coating the outer surface of the article (such as by spraying) with a second polymeric material. However, this two-step process can result in uneven layer thickness. Moreover, each two-step process requires sufficient bonding between the first polymeric material and the second polymeric material.

The art recognizes the need for a one-step production of a rotational molded article. The art further recognizes the need for the one-step production of a rotational molded article with a modified outer surface.

SUMMARY

The present disclosure provides a process. The process includes providing a blend containing (A) a first powder including (i) a polyolefin having a density from 0.860 g/cc to 0.910 g/cc, and a melt index from 1.5 g/10 min to 1,000 g/10 min; (ii) from 1 wt % to 15 wt % of a dispersant selected from an acrylic dispersant, a poloxamer, and combinations thereof; and (iii) optionally, a polyolefin wax, the first powder having a mean volume average particle size from 1 μm to 300 μm; and (B) a second powder including an ethylene/α-olefin copolymer having (i) a density from 0.920 g/cc to 0.955 g/cc; and (ii) a melt index from 1.0 g/10 min to 15 g/10 min, the second powder having a mean volume average particle size from 325 μm to 4,000 μm; and rotational molding the blend to form a rotational molded article.

The present disclosure also provides a rotational molded article. The rotational molded article contains an ethylene/α-olefin copolymer having a density from 0.920 g/cc to 0.955 g/cc and a melt index from 1.0 g/10 min to 15 g/10 min; a polyolefin having a density from 0.860 g/cc to 0.910 g/cc, and a melt index from 1.5 g/10 min to 1,000 g/10 min; a dispersant selected from an acrylic dispersant, a poloxamer, and combinations thereof; and optionally, a polyolefin wax.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkyl" refers to an organic radical derived from an aliphatic hydrocarbon by deleting one hydrogen atom therefrom. An alkyl group may be a linear, branched, cyclic or a combination thereof. Nonlimiting examples of suitable alkyls include methyl, ethyl, n-propyl, i-propyl, n-butyl, t-butyl, i-butyl (or 2-methylpropyl), etc. In an embodiment, the alkyl has from 1 to 8, or 12, or 20 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "agglomerate" is a plurality of individual fine solid particles clumped or otherwise together forming a single mass.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE), medium density polyethylene (MDPE), and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

A "medium density polyethylene" (or "MDPE") is an ethylene homopolymer or an ethylene/α-olefin copolymer with at least one $C_4$-$C_{10}$ α-olefin comonomer, or $C_4$-$C_8$ α-olefin comonomer and a density from 0.926 g/cc, or 0.930 g/cc to 0.935 g/cc, or 0.940 g/cc. The MDPE can be a monomodal copolymer or a multimodal copolymer. A nonlimiting example of MDPE includes RESILITY™ XDPDB-3162, available from The Dow Chemical Company.

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers)

and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. Nonlimiting examples of suitable propylene copolymer include propylene impact copolymer and propylene random copolymer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ULDPE resins (available from The Dow Chemical Company) and FLEXOMER™ VLDPE resins (available from The Dow Chemical Company).

Test Methods

Acid value (or acid number) is measured in accordance with ASTM D 1386/7. Acid value is a measure of the amount of unreacted fatty acid present in the final composition. The acid value is the number of milligrams of potassium hydroxide required for the neutralization of free fatty acids present in one gram of a substance (e.g., the ethylene-based polymer). Units for acid value are mg KOH/g.

D10, D50, and D90 particle size is measured using a Coulter LS 230 Laser Light Scattering Particle Sizer, available from Coulter Corporation. D10 particle size is the particle diameter at which 10% of the powder's mass is composed of particles with a diameter less than this value. D50 particle size is the particle diameter at which 50% of the powder's mass is composed of particles with a diameter less than this value and 50% of the power's mass is composed of particles with a diameter greater than said value. D90 particle size is the particle diameter at which 90% of the powder's mass is composed of particles with a diameter less than this value.

Coefficient of Friction (COF) is measured in accordance with ASTM D1894. Kinetic COF and Static COF are measured on a TMI Coefficient of Friction Tester, Model 32-06-00-0002, using a steel substrate. Kinetic COF and Static COF are measured at room temperature (25° C.) and 35% relative humidity. Kinetic COF is measured at a sliding speed of 100 mm per minute.

Density is measured in accordance with ASTM D792, Method B. The result is recorded in grams per cubic centimeter (g/cc).

Drop point is measured in accordance with ASTM D3954.

Mean volume average particle size is measured using a Coulter LS 230 Laser Light Scattering Particle Sizer, available from Coulter Corporation.

Melt index (MI) (I2) in g/10 min is measured using ASTM D1238 (190° C./2.16 kg).

Melting point, Tm, is measured in degrees Celsius (° C.) by the Differential Scanning calorimetry (DSC) technique for measuring the melting peaks of polyolefins as described in U.S. Pat. No. 5,783,638. It should be noted that many blends comprising two or more polyolefins will have more than one melting peak; many individual polyolefins will comprise only one melting peak.

Melt flow rate (MFR) in g/10 min is measured using ASTM D1238 (230° C./2.16 kg).

Melt viscosity is measured using a Brookfield Viscometer Model, and a Brookfield RV-DV-II-Pro viscometer spindle 31, at 135° C. for the ethylene-based wax and at 170° C. for the propylene-based wax. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature until the melted sample is one inch below the top of the sample chamber. The viscometer apparatus is lowered, and the spindle submerged into the sample chamber. Lowering was continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for 15 minutes, or until the values stabilize, at which point, a final reading is recorded.

Particle size distribution is calculated in accordance with Equation A:

$$\text{Particle size distribution} = \frac{(D90 - D10)}{D50}. \quad \text{Equation A}$$

Peak internal air temperature (PIAT) is the highest temperature that the air inside a mold reaches during rotational molding. PIAT is measured with a Paladin Sales EX Logger.

Shore A Hardness is measured in accordance with ASTM D2240-05.

Shore D Hardness is measured in accordance with ASTM D2240-05.

Particle Density

A LUMiSizer multi-sample analytical centrifuge is used to screen emulsion stability. Each sample is spun through an array of IR lasers and detectors which translate the transmission values into a 2-dimension profile. The progression of the transmission profiles relates to the terminal velocity V, of a dispersed droplet as defined by Stokes law, Equation C:

$$V = \frac{2r_d^2 g(\rho_d - \rho_f)}{9\eta} \quad \text{Equation C}$$

where $r_d$ is the droplet radius, g is acceleration of the droplet, $\rho_d$ is droplet density, $\rho_f$ fluid medium density, and η is the dynamic viscosity of the fluid. Equation D defines the relative acceleration factor of the LUMiSizer, where r is the position of the sample in mm and rpm is the rotor speed in revolutions per minute. This acceleration of gravity is multiplied by this factor and substituted into Equation C.

$$g = \text{Acceleration Factor} = 1.18 * r * \left(\frac{rpm}{1000}\right)^2 \quad \text{Equation D}$$

With a known particle diameter, Equation C can determine the particle density of polymeric particles. For example, when a LUMiSizer determines a particle velocity of 12.7 μm/s and an acceleration force of 2.45E9 μm/s², literature values for the density and viscosity of water at 20° C. are used (1E-12 g/μm³ and 1E-6 g/μm-s, respectively), and multiple light scattering determines an average particle size of 37 μm, plugging these values into Equation C and solving for density yields a density of 0.96 g/cm³. With the expected density of these particles being 0.975 g/cm³, this indicates there are very few to no voids, with the particle being 98.4% of the expected density.

Sphericity

Scanning electron microscopy images are taken to characterize the particles. Images of smooth spheroids exhibit no visible voids up to 10,000× magnification. "Sphericity" (ψ) of a particle is the ratio of the surface area of a sphere (with the same volume as the given particle) to the surface area of the particle. For a spheroid, sphericity (ψ) is calculated in accordance with Equation B, where V is volume and A is surface area, and is obtained by measuring the length of the axes of the 2D projection of the spherical particle, approximating it as a spheroid, and solving the equation where a and b are the semi-major and semi-minor axes of the spheroid respectively.

$$\Psi = \frac{\lambda^{\frac{1}{8}}(6V_p)^{\frac{3}{\lambda}}}{A_p} = \frac{2\sqrt[3]{ab^2}}{a + \frac{\delta^2}{\sqrt{a^2 \ldots b^2}} \ln\left(\frac{\alpha + \sqrt{a^2 b^3}}{\delta}\right)}.$$

Equation B

DETAILED DESCRIPTION

The present disclosure relates to a process. The process includes providing blend containing (A) a first powder and (B) a second powder; and rotational molding the blend to form a rotational molded article. The (A) first powder contains (i) a polyolefin having a density from 0.860 g/cc to 0.910 g/cc, and a melt index from 1.5 g/10 min to 1,000 g/10 min; (ii) from 1 wt % to 15 wt % of a dispersant selected from an acrylic dispersant, a poloxamer, and combinations thereof; and (iii) optionally, a polyolefin wax. The (A) first powder has a mean volume average particle size from 1 μm to 300 μm. The (B) second powder contains an ethylene/α-olefin copolymer that has (i) a density from 0.920 g/cc to 0.955 g/cc; and (ii) a melt index from 1.0 g/10 min to 15 g/10 min. The (B) second powder has a mean volume average particle size from 325 μm to 4,000 μm.

Providing a Blend

The present process includes the step of providing a blend containing (A) a first powder and (B) a second powder.

The mean volume average particle size of (A) the first powder (from 1 μm to 300 μm) is smaller than the mean volume average particle size of (B) the second powder (from 325 μm to 4,000 μm). The first powder having a mean volume average particle size from 1 μm to 300 μm is interchangeably referred to as the "small powder." The second powder having a mean volume average particle size from 325 μm to 4,000 μm is interchangeably referred to as the "large powder."

A. First Powder (Small Powder)

The blend includes a first powder (or small powder) containing (i) a polyolefin having a density from 0.860 g/cc to 0.910 g/cc, and a melt index from 1.5 g/10 min to 1,000 g/10 min; (i) from 1 wt % to 15 wt % of a dispersant selected from an acrylic dispersant, a poloxamer, and combinations thereof; (iii) optionally, a polyolefin wax; and (iv) optionally, an additive. The small powder has a mean volume average particle size from 1 μm to 300 μm.

i. Polyolefin

The small powder includes a polyolefin. Nonlimiting examples of suitable polyolefins include ethylene-based polymer, propylene-based polymer, and combinations thereof.

The polyolefin has a density from 0.860 g/cc to 0.910 g/cc. In an embodiment, the polyolefin has a density from 0.860 g/cc, or 0.870 g/cc, or 0.875 g/cc, or 0.877 g/cc to 0.900 g/cc, or 0.905 g/cc, or 0.910 g/cc.

The polyolefin has a melt index from 1.5 g/10 min to 1,000 g/10 min. In an embodiment, the polyolefin has a melt index from 1.5 g/10 min, or 2.0 g/10 min, or 4.0 g/10 min to 9.0 g/10 min, or 10.0 g/10 min, or 20 g/10 min, or 30 g/10 min, or 50 g/10 min, or 100 g/10 min, or 500 g/10 min, or 1,000 g/10 min. In a further embodiment, the polyolefin has a melt index from 1.5 g/10 min to 20 g/10 min.

In an embodiment, the polyolefin has a melting temperature from 95° C., 96° C., or 115° C., or 120° C., or 122° C. to 148° C., or 150° C., or 155° C., or 160° C., or 165° C., or 170° C. In another embodiment, the polyolefin has a melting temperature from greater than 115° C. to 170° C., or from 120° C. to 150° C.

In an embodiment, the polyolefin has a Shore A hardness from 50, or 55, or 60, or 65 to 69, or 70, or 75, or 80.

1. Ethylene-Based Polymer

In an embodiment, the polyolefin is an ethylene-based polymer. Nonlimiting examples of suitable ethylene-based polymer include LDPE; LLDPE; ULDPE; VLDPE; EPE; ethylene/α-olefin multi-block copolymers; substantially linear, or linear, plastomers/elastomers; HDPE; and combinations thereof.

The term "ethylene/α-olefin multi-block copolymer" refers to an ethylene/C4-C8 α-olefin multi-block copolymer composed of, or otherwise consisting of, ethylene and one copolymerizable C4-C8 α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The C4-C8 α-olefin is selected from butene, hexene, and octene. The ethylene/α-olefin multi-block copolymer is void of, or otherwise excludes, styrene (i.e., is styrene-free), and/or is void of vinyl aromatic monomer, and/or is void of conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: $Tm > -2002.9 + 4538.5(d) - 2422.2(d)^2$, where the density, d, is from 0.860 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 120° C., or 122° C., or 125° C.; and/or (iv) a melt index (MI) from 1.5 g/10 min; or 2.0 g/10 min, or 5 g/10 min to 6 g/10 min, or 10 g/10 min, or 50 g/10 min; and/or (v) 50-85 wt % soft segment and 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % octene in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% min$^{-1}$ deformation rate at 21° C. as measured in accordance with ASTM D 1708; and/or (ix) a polydisperse distribution of blocks and a polydisperse distribution of block sizes; and/or (x) a Shore A hardness from 60, or 65 to 69, or 70, or 75.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Michigan, USA.

In an embodiment, the ethylene-based polymer is selected from HDPE, LDPE, and ethylene/α-olefin multi-block copolymer. The ethylene-based polymer has one, some, or all of the following properties: (i) a melt index from 1.5 g/10 min, or 2.0 g/10 min, or 4.0 g/10 min to 5.0 g/10 min, or 10.0 g/10 min, or 15 g/10 min; and/or (ii) a melting temperature from 115° C., or 118° C., or 120° C., or 122° C. to 125° C., or 130° C.; and/or (iii) a density from 0.875 g/cc, or 0.877 g/cc to 0.900 g/cc, or 0.910 g/cc.

The ethylene-based polymer may comprise two or more embodiments discussed herein.

2. Propylene-Based Polymer

In an embodiment, the polyolefin for the first powder is a propylene-based polymer. Nonlimiting examples of suitable propylene-based polymer include propylene copolymer, propylene homopolymer, and combinations thereof.

In an embodiment, the propylene-based polymer is a propylene homopolymer. The propylene homopolymer contains 100 wt % units derived from propylene, based on the total weight of the propylene homopolymer. In an embodiment, the propylene homopolymer is DOW™ 6D43, available from The Dow Chemical Company.

In an embodiment, the propylene-based polymer is a propylene/α-olefin copolymer. Nonlimiting examples of suitable α-olefins include $C_2$ and $C_4$-$C_{20}$ α-olefins, or $C_4$-$C_{10}$ α-olefins, or $C_4$-$C_8$ α-olefins. Representative α-olefins include ethylene, 1-butene, 1-pentene, 1-hexene, 1-heptene and 1-octene. In an embodiment, the propylene-based polymer does not contain an aromatic comonomer polymerized therein. In an embodiment, the propylene/α-olefin copolymer is a propylene/ethylene copolymer containing greater than 50 wt % units derived from propylene, or from 51 wt %, or 55 wt %, or 60 wt % to 70 wt %, or 80 wt %, or 90 wt %, or 95 wt %, or 99 wt % units derived from propylene, based on the weight of the propylene/ethylene copolymer. The propylene/ethylene copolymer contains a reciprocal amount of units derived from ethylene, or from less than 50 wt %, or 49 wt %, or 45 wt %, or 40 wt % to 30 wt %, or 20 wt %, or 10 wt %, or 5 wt %, or 1 wt %, or 0 wt % units derived from ethylene, based on the weight of the propylene/ethylene copolymer.

The propylene-based polymer may comprise two or more embodiments discussed herein.

In an embodiment, the polyolefin is selected from propylene homopolymer, HDPE, LDPE, ethylene/α-olefin multi-block copolymer, and combinations thereof.

The polyolefin may comprise two or more embodiments discussed herein.

ii. Dispersant

The small powder includes a dispersant. The dispersant is selected from an acrylic dispersant, a poloxamer dispersant, and combinations thereof.

1. Acrylic Dispersant

In an embodiment, the dispersant is an acrylic dispersant. An "acrylic dispersant" is an acrylic-monomer containing material that promotes the formation and stabilization of a dispersion. Nonlimiting examples of suitable acrylic monomer include alkyl(meth)acrylates, ethyl hexylacrylate (2-EHA), and combinations thereof. Nonlimiting examples of suitable (meth)acrylate monomer include nonionic copolymerized monoethylenically unsaturated monomers such as (meth)acrylic ester monomer including methyl(meth)acrylate (MMA), ethyl(meth)acrylate, butyl(meth)acrylate, 2-ethylhexyl(meth)acrylate, decyl(meth)acrylate, hydroxyethyl(meth)acrylate, hydroxypropyl(meth)acrylate, ureido-functional (meth)acrylates and acetoacetates, acetamides or cyanoacetates of (meth)acrylic acid; styrene or substituted styrenes; vinyl toluene; monoethylenically unsaturated acetophenone or benzophenone derivatives; vinyl acetate or other vinyl esters; vinyl monomers such as vinyl chloride, vinylidene chloride, N-vinyl pyrollidone; and (meth)acrylonitrile. The term "(meth)" followed by another term such as (meth)acrylate refers to both acrylates and methacrylates.

In an embodiment, the acrylic dispersant contains at least one acrylic monomer and a carboxylic acid comonomer. Nonlimiting examples of suitable carboxylic acid comonomers include acrylic acid, methacrylic acid (MAA), crotonic acid, itaconic acid, fumaric acid, maleic acid, monomethyl itaconate, monomethyl fumarate, monobutyl fumarate, and maleic anhydride. In an embodiment, the acrylic dispersant is an alkyl (meth)acrylate/carboxylic acid interpolymer. In a further embodiment, the acrylic dispersant is a 2-EHA/alkyl (meth)acrylate/carboxylic acid terpolymer.

In an embodiment, the acrylic dispersant is ethylene-free.

In an embodiment, the acrylic dispersant is an ethyl hexylacrylate/methylmethacrylate/methacrylic acid terpolymer. In a further embodiment, the ethyl hexylacrylate/methylmethacrylate/methacrylic acid terpolymer contains from 5 wt %, or 10 wt % to 74 wt %, or 75 wt %, or 80 wt % units derived from 2-EHA; from 1 wt %, or 2 wt % to 66 wt %, or 70 wt % units derived from MMA; and from 15 wt %, or 19 wt % to 24 wt %, or 25 wt % units derived from MAA. In an embodiment, the ethyl hexylacrylate/methylmethacrylate/methacrylic acid terpolymer has one, some, or all of the following properties: (i) a glass transition temperature, Tg, from −60° C., or −50° C., or −40° C., or −30° C., or −20° C., or −10° C., or 0° C., to 5° C., or 10° C., or 50° C., or 90° C., or 100° C.; and/or (ii) a viscosity from 70 mPa·s, or 80 mPa·s to 90 mPa·s, or 100 mPa·s, or 150 mPa·s, or 190 mPa·s, or 200 mPa·s; and/or (iii) an acid value from 100 mg KOH/g, or 110 mg KOH/g, or 140 mg KOH/g, or 150 mg KOH/g to 155 mg KOH/g, or 160 mg KOH/g, or 170 mg KOH/g; and/or (iv) a pH from 4.0, or 4.4 to 4.5, or 5.0, or 6.0, or 7.0.

In an embodiment, the acrylic dispersant is a liquid at room temperature (23° C.).

The acrylic dispersant may comprise two or more embodiments discussed herein.

2. Poloxamer Dispersant

In an embodiment, the dispersant is a poloxamer dispersant. A "poloxamer dispersant" is a block copolymer of ethylene oxide and propylene oxide that promotes the formation and stabilization of a dispersion.

Nonlimiting examples of suitable poloxamer dispersant include the nonionic surface active agents marketed by Wyandotte Chemicals prepared (see the Pluronic Grid Approach, vol. II, Wyandotte Chemicals Corp., 1957) by polymerizing ethylene oxide on the ends of a preformed polymeric base of polyoxypropylene. Both the length or molecular weight of the polyoxypropylene base and the polyoxyethylene end segments can be varied to yield a wide variety of products. For example, a nonlimiting example of a suitable poloxamer dispersant is Pluronic=F-98, wherein a polyoxypropylene with a weight average molecular weight (Mw) of 2,700 is polymerized with ethylene oxide to give a product having a Mw about 13,500 g/mol. This product may be described as containing 20 wt % of propylene oxide and 80 wt % of ethylene oxide, based on the total weight of the poloxamer dispersant. An example of another suitable Pluronic is F-108 (Mw=14,600 g/mol, 20 wt % propylene oxide, 80 wt % ethylene oxide). In an embodiment, the poloxamer dispersant contains at least 50 wt % ethylene oxide, or from 50 wt % to 80 wt % ethylene oxide; and a reciprocal amount, or from 20 wt % to 50 wt % propylene oxide, based on the total weight of the poloxamer dispersant.

In an embodiment, the poloxamer dispersant has a melting point, Tm, from 40° C., or 50° C., or 55° C., or 57° C. to 60° C., or 65° C., or 70° C., or 80° C., or 90° C., or 100° C.

The poloxamer dispersant may comprise two or more embodiments discussed herein.

iii. Optional Polyolefin Wax

In an embodiment, the small powder includes an optional polyolefin wax. The polyolefin wax may be an ethylene-based wax or a propylene-based wax.

1. Ethylene-Based Wax

In an embodiment, the polyolefin wax is an ethylene-based wax. An "ethylene-based wax" is an ethylene-based polymer having a melt viscosity, at 140° C., that is less than, or equal to (≤) 1,000 mPa·s, or 500 mPa·s. The ethylene-based wax is composed of a majority amount (i.e., greater than 50 wt %) of polymerized ethylene monomer and optional α-olefin comonomer.

In an embodiment, the ethylene-based wax is selected from a high density, low molecular weight polyethylene wax, a by-product polyethylene wax, a Fischer-Tropsch wax containing an ethylene-based polymer, oxidized Fischer-Tropsch waxes containing an ethylene-based polymer, functionalized polyethylene waxes, and combinations thereof.

In an embodiment, the ethylene-based wax has one, some, or all of the following properties: (i) a density from 0.900 g/cc, or 0.910 g/cc, or 0.920 g/cc, or 0.930 g/cc to 0.940 g/cc, or 0.950 g/cc, or 0.960 g/cc, or 0.970 g/cc, or 0.980 g/cc, or 0.990 g/cc, or 0.995 g/cc; and/or (ii) a melt viscosity, at 140° C., from 40 mPa·s, or 50 mPa·s, or 60 mPa·s to 65 mPa·s, or 70 mPa·s, or 75 mPa·s, or 80 mPa·s, or 90 mPa·s, or 100 mPa·s, or 200 mPa·s, or 300 mPa·s, or 400 mPa·s, or 500 mPa·s; and/or (iii) an acid value from 0 mg KOH/g, or 10 mg KOH/g, or 20 mg KOH/g, or 30 mg KOH/g, or 40 mg KOH/g to 45 mg KOH/g, or 50 mg KOH/g; and/or (iv) a drop point from 100° C., or 110° C., or 115° C., or 120° C. to 123° C., or 125° C., or 130° C., or 140° C.

The ethylene-based wax may comprise two or more embodiments discussed herein.

2. Propylene-Based Wax

In an embodiment, the polyolefin wax is a propylene-based wax. A "propylene-based wax" is a propylene-based polymer having a melt viscosity, at 170° C., that is less than, or equal to (≤)1,500 mPa·s, or 1,400 mPa·s, or 1,000 mPa·s. The propylene-based wax is composed of a majority amount (i.e., greater than 50 wt %) of polymerized propylene monomer and optional α-olefin comonomer. In an embodiment, the propylene-based wax is a propylene homopolymer. The propylene-based wax may be produced by way of Ziegler-Natta catalyst polymerization or metallocene catalyst polymerization yielding a Ziegler-Natta catalyzed propylene-based wax or a metallocene-catalyzed propylene-based wax, respectively. Nonlimiting examples of suitable propylene-based waxes include those sold under the tradename LICOCENE, available from Clariant.

In an embodiment, the propylene-based wax has one, some, or all of the following properties: (i) a density from 0.89 g/cc, or 0.90 g/cc to 0.91 g/cc, or 0.95 g/cc; and/or (ii) a melt viscosity, at 170° C., from 40 mPa·s, or 50 mPa·s, or 60 mPa·s to 70 mPa·s, or 80 mPa·s, or 90 mPa·s, or 100 mPa·s, or 500 mPa·s, or 1,000 mPa·s, or 1,400 mPa·s, or 1,500 mPa·s; and/or (iii) an acid value from 0 mg KOH/g, or 10 mg KOH/g, or 20 mg KOH/g, or 30 mg KOH/g, or 40 mg KOH/g to 41 mg KOH/g, or 45 mg KOH/g, or 50 mg KOH/g; and/or (iv) a drop point from 120° C., or 130° C., or 140° C. to 144° C., or 145° C., or 150° C., or 155° C.

The propylene-based wax may comprise two or more embodiments discussed herein.

In an embodiment, the polyolefin wax is functionalized, such as a functionalized ethylene-based wax or a functionalized propylene-based wax. A nonlimiting example of a suitable functionalized polyolefin wax is a carboxylic-functionalized polyolefin wax. A "carboxylic-functionalized polyolefin wax" is a polyolefin wax with a carboxylic acid-based moiety bonded to the polyolefin chain (for example, a carboxylic acid-based moiety grafted to the polyolefin chain). A "carboxylic acid-based moiety" is a compound that contains a carboxyl group (—COOH) or a derivative thereof. Nonlimiting examples of suitable carboxylic acid-based moieties include carboxylic acids and carboxylic acid anhydrides. Nonlimiting examples of suitable carboxylic acids and carboxylic acid anhydrides that can be grafted onto the polyolefin include maleic acid, fumaric acid, itaconic acid, acrylic acid, methacrylic acid, crotonic acid, maleic anhydride, and itaconic anhydride. In an embodiment, the carboxylic-functionalized polyolefin wax is a maleic-anhydride-functionalized polyolefin wax.

In an embodiment, the carboxylic-functionalized ethylene-based wax is a maleic-anhydride-grafted ethylene-based wax. A nonlimiting example of a suitable maleic-anhydride-grafted ethylene-based wax is Licocene™ PE MA 4351, available from Clariant.

The polyolefin wax may comprise two or more embodiments discussed herein.

iv. Optional Additive

In an embodiment, the small powder includes an optional additive.

Nonlimiting examples of suitable additives include flow aid, filler, and combinations thereof.

In an embodiment, the small powder includes a flow aid. Nonlimiting examples of suitable flow aids include talc (such as ultra talc), silica-based flow aids (such as fumed silica, colloidal silica, silicon dioxide, and calcium silicate), clay (such as kaolin clay), diatomaceous earth, limestone, and combinations thereof. In an embodiment, the powder contains from 0.05 wt %, or 1.0 wt % to 1.5 wt %, or 2.0 wt % flow aid, based on the total weight of the small powder.

In an embodiment, the small powder includes a filler. Nonlimiting examples of suitable filler include silica, glass, metal, calcium carbonate, pigment, titanium dioxide, zinc oxide, flame retardant, and combinations thereof.

The additive may comprise two or more embodiments discussed herein.

The small powder may be produced as described in U.S. Provisional Application No. 62/576,863 filed 25 Oct. 2017; U.S. Provisional Application No. 62/576,907 filed 25 Oct. 2017; and U.S. Pat. No. 7,763,676, the entire contents of which are each hereby incorporated by reference. In an embodiment, the small powder is produced by melt blending in a continuous extruder-based mechanical dispersion process such as the BLUEWAVE™ process of The Dow Chemical Company.

The small powder has a mean volume average particle size from 1 μm to 300 μm. In an embodiment, the small powder has a mean volume average particle size from 1 μm, or 10 μm, or 11 μm, or 20 μm, or 40 μm, or 45 μm to 50 μm, or 60 μm, or 70 μm, or 100 μm, or 110 μm, or 150 μm, or 199 μm, or 200 μm, or 210 μm, or 250 μm, or 275 μm, or 300 μm. In an embodiment, the small powder has a mean volume average particle size from 20 μm to 90 μm, or from 20 μm to 50 μm, or from 50 μm to 90 μm, or from 40 μm to 60 μm, or from 45 μm to 50 μm.

In an embodiment, the small powder has a sphericity from 0.92 to 1.0. In an embodiment, the small powder has a sphericity from 0.92, or 0.95, or 0.98 to 0.99, or 1.0. A sphericity of 1.0 indicates a powder particle's surface area is the same as the surface area of a sphere with the same volume as the given particle. In other words, a sphericity of 1.0 indicates a small powder particle is spherical in shape with no surface voids.

In an embodiment, the small powder has a particle size distribution from 1 to 10, or from 1 to less than 2. In an embodiment, the small powder has a particle size distribution from 1.0, or 1.1, or 1.2 to 1.3, or 1.4, or 1.5, or 1.6, or 1.7, or 1.8, or 1.9, or 2.0, or 5.0, or 10. A particle size distribution from 1 to less than 2 indicates the small powder includes particles of the same size, or substantially the same size.

In an embodiment, the small powder has a particle density from 98% to 100%. A particle density of 100% indicates a small powder includes particles with no voids. The small powder is a low porosity powder. A "low porosity" powder is a powder containing single particles with a particle density from 98% to 100%. A low porosity powder excludes powders containing agglomerates, which have a particle density of less than 80%.

In an embodiment, the small powder has a D90 particle size from 1 μm, or 5 μm, or 10 μm, or 20 μm, or 50 μm, or 60 μm, or 70 μm, or 80 μm, or 90 μm, or 100 μm, or 110 μm to 120 μm, or 130 μm, or 140 μm, or 150 μm, or 200 μm, or 250 μm, or 270 μm, or 300 μm, or 350 μm, or 400 μm, or 440 μm, or 450 μm, or 460 μm. In an embodiment, the small powder has a D10 particle size from 1.0 μm, or 3.0 μm, or 5.0 μm, or 10 μm to 15 μm, or 20 μm, or 25 μm, or 30 μm, or 40 μm, or 45 μm, or 50 μm.

In an embodiment, the small powder has the following properties: (i) a mean volume average particle size from 1 μm, or 10 μm, or 11 μm, or 20 μm, or 40 μm to 50 μm, or 60 μm, or 70 μm, or 100 μm, or 110 μm, or 150 μm, or 199 μm, or 200 μm, or 210 μm, or 250 μm, or 275 μm, or 300 μm; (ii) a sphericity from 0.92, or 0.95, or 0.98 to 0.99, or 1.0; (iii) a particle size distribution from 1.0, or 1.1, or 1.2 to 1.3, or 1.4, or 1.5, or 1.6, or 1.7, or 1.8, or 1.9, or less than 2.0; and (iv) a particle density from 98% to 100%; and the small powder optionally has one, some or all of the following properties: (vi) a D10 particle size from 1.0 μm, or 3.0 μm, or 5.0 μm, or 10 μm to 15 μm, or 20 μm, or 25 μm, or 30 μm; and/or (vii) a D90 particle size from 50 μm, or 60 μm, or 70 μm, or 80 μm, or 90 μm, or 100 μm, or 110 μm to 120 μm, or 130 μm, or 140 μm, or 150 μm, or 200 μm, or 250 μm.

In an embodiment, the small powder contains, consists essentially of, or consists of: (a) from 60 wt %, or 70 wt % to 80 wt %, or 90 wt % of the polyolefin that is an ethylene-based polymer having a melting temperature from greater than 115° C. to 140° C.; (b) from 5 wt %, or 7 wt % to 8 wt %, 10 wt %, or 20 wt % of the poloxamer dispersant; and (c) from 5 wt %, or 10 wt % to 15 wt %, or 20 wt % of the polyolefin wax, the polyolefin, the poloxamer dispersant, and the polyolefin wax forming 100 wt % of the small powder; and the small powder has: (i) a mean volume average particle size from 1 μm, or 10 μm, or 20 μm to 50 μm, or 60 μm, or 70 μm, or 100 μm, or 110 μm, or 300 μm; (ii) a sphericity from 0.92, or 0.94 to 0.96, or 1.0; (iii) a particle size distribution from 1.0, or 1.4 to 1.6, or less than 2.0; (iv) a particle density from 98% to 100%; (v) optionally, a D10 particle size from 5.0 μm, or 10 μm to 15 μm, or 20 μm; and (vi) optionally, a D90 particle size from 90 μm, or 100 μm, or 110 μm to 120 μm, or 130 μm, or 140 μm.

In an embodiment, the small powder is substantially void of, or is void of, ethylene plastomers/elastomers.

It is understood that the sum of the components in each of the small powders disclosed herein, including the foregoing small powder, yields 100 wt %.

In an embodiment, the small powder is void of, or substantially void of, agglomerates.

The small powder may comprise two or more embodiments disclosed herein.

B. Second Powder (Large Powder)

The blend includes (B) a second powder (or "large powder") containing an ethylene/α-olefin copolymer with (i) a density from 0.920 g/cc to 0.955 g/cc; (ii) a melt index from 1.0 g/10 min to 15 g/10 min; and (iii) a mean volume average particle size from 325 μm to 4,000 μm.

The large powder contains an ethylene/α-olefin copolymer. The ethylene/α-olefin copolymer contains ethylene and an α-olefin comonomer, and an optional additive. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene/α-olefin copolymer does not contain an aromatic comonomer polymerized therein.

In an embodiment, the ethylene/α-olefin copolymer consists of ethylene, the $C_4$-$C_8$ α-olefin comonomer, and optional additive.

In an embodiment, the ethylene/α-olefin copolymer for the second powder is an ethylene/1-hexene copolymer.

The ethylene/α-olefin copolymer of the (B) large powder is different than the polyolefin of the (A) small powder. For example, the ethylene/α-olefin copolymer of the (B) large powder has a density from 0.920 g/cc to 0.955 g/cc, which is different than the density polyolefin of the (A) small powder (from 0.860 g/cc to 0.910 g/cc).

In an embodiment, the ethylene/α-olefin copolymer contains greater than 50 wt % units derived from ethylene, or from 51 wt %, or 55 wt %, or 60 wt % to 70 wt %, or 80 wt %, or 90 wt %, or 95 wt %, or 99 wt % units derived from ethylene, based on the weight of the ethylene/α-olefin copolymer. In an embodiment, the ethylene/α-olefin copolymer contains a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt % units derived from an α-olefin comonomer, based on the weight of the ethylene/α-olefin copolymer.

The ethylene/α-olefin copolymer has a density from 0.920 g/cc to 0.955 g/cc. In an embodiment, the ethylene/α-olefin copolymer has a density from 0.920 g/cc, or 0.930 g/cc, 0.935 g/cc to 0.940 g/cc, or 0.945 g/cc, or 0.950 g/cc, or 0.955 g/cc.

The ethylene/α-olefin copolymer has a melt index from 1.0 g/10 min to 15 g/10 min. In an embodiment, the ethylene/α-olefin copolymer has a melt indexfrom 1.0 g/10 min, or 2.0 g/10 min, or 4.0 g/10 min, or 5.0 g/10 min to 6.0 g/10 min, or 7.0 g/10 min, or 10.0 g/10 min, or 15 g/10 min.

In an embodiment, the ethylene/α-olefin copolymer has a Shore D hardness from 54, or 55, or 56, or 57, or 58 to 58.5, or 59.

In an embodiment, the ethylene/α-olefin copolymer is selected from HDPE, MDPE, and combinations thereof. In an embodiment, the ethylene/α-olefin copolymer is a MDPE. A nonlimiting example of a suitable MDPE is RESILITY™ XDPDB-3162, available from The Dow Chemical Company.

The ethylene/α-olefin copolymer may comprise two or more embodiments disclosed herein.

The large powder optionally contains an additive. A nonlimiting example of a suitable additive is a pigment.

The large powder has a mean volume average particle size from 325 μm to 4,000 μm. In an embodiment, the large powder has a mean volume average particle size from 325 μm, or 400 μm, or 450 μm, or 500 μm, or 550 μm, or 600 μm, or 700 μm to 750 μm, or 800 μm, or 850 μm, or 900 μm, or 1,000 μm, or 2,000 μm, or 3,000 μm, or 4,000 μm. In an embodiment, the large powder has a mean volume average particle size from 400 μm to 2,000 μm, or from 500 μm to 1,000 μm, or from 550 μm to 700 μm. It is understood that the large powder particles may be spherical powder particles, aggregated powder particles, micropellets and/or granulated ethylene/α-olefin copolymer.

In an embodiment, the ethylene/α-olefin copolymer is a MDPE. The MDPE has the following properties: (i) a density from 0.930 g/cc, 0.935 g/cc to 0.940 g/cc; (ii) a melt index from 1.0 g/10 min, or 2.0 g/10 min, or 3.0 g/10 min, or 4.0 g/10 min, or 5.0 g/10 min to 6.0 g/10 min, or 7.0 g/10 min, or 10.0 g/10 min; and (iii) optionally, a Shore D hardness from 54, or 55, or 56, or 57, or 58 to 58.5, or 59; and the (B) large powder has a mean volume average particle size from 500 μm, or 550 μm, or 600 μm, or 700 μm to 750 μm, or 800 μm, or 850 μm, or 900 μm; or from 550 μm to 700 μm.

The large powder may comprise two or more embodiments disclosed herein.

The blend contains, consists essentially of, or consists of, the (A) small powder and (B) the large powder.

In an embodiment, the blend contains (A) from 5 wt %, or 10 wt %, or 15 wt % to 20 wt %, or 25 wt %, or 30 wt %, or 35 wt %, or 40 wt % small powder; and a reciprocal amount of (B) the large powder, or from 60 wt %, or 65 wt %, or 70 wt %, or 75 wt %, or 80 wt % to 85 wt %, or 90 wt %, or 95 wt % large powder, based on the total weight of the blend. The (A) small powder and (B) large powder form 100 wt % of the blend.

The blend is formed before either (A) the small powder or (B) the large powder is heated to a molten form. In other words, the blend is formed when (A) the small powder and (B) the large powder each is in a solid form, or in a substantially solid form.

In an embodiment, the process includes first contacting the small powder with a pre-heated mold surface of a rotational molder; and subsequently contacting the large powder with the small powder to form the blend in the rotational molder. The rotational molder may or may not be rotated before the addition of the large powder to the mold (and creating contact between the first powder and the second powder). In an embodiment, the rotational molder is not rotated before contacting the large powder with the small powder.

In an embodiment, the process includes forming the blend by first loading (A) the small powder into a rotational molder; and subsequently loading (B) the large powder into the rotational molder. The (A) small powder is not rotated in the rotational molder before the loading of the (B) large powder. In an embodiment, the (B) large powder is loaded into the rotational molder within 15 seconds, or 30 seconds, or 60 seconds of the (A) small powder being loaded into the rotational molder.

In an embodiment, the blend is formed by pre-mixing (A) the small powder and (B) the large powder. Subsequently, the pre-mixed blend is loaded into a rotational molder. The pre-mixed blend is loaded into the rotational molder when (A) the small powder and (B) the large powder each is in a solid form.

The providing a blend step may comprise two or more embodiments disclosed herein.

Rotational Molding the Blend to Form an Article

The present process includes the step of rotational molding the blend to form a rotational molded article.

"Rotational molding" (or "rotomolding") is a process for producing a hollow article in which powder particles (i.e., solid polymeric material) are loaded into a hollow mold, which is then rotated biaxially in a heated oven until the powder particles melt and coat the heated mold surface of the inside of the mold cavity. A mold that is rotated "biaxially" is rotated simultaneously in two planes perpendicular to each other (i.e., around a major axis and a minor axis). The hollow mold has two opposing surfaces, including an inner surface (also known as a mold surface) and an outer surface. The inner surface (or mold surface) is in contact with the blend during rotomolding.

During rotomolding, the powder particles melt into the mold, rather than being forced under pressure into the mold in a molten (i.e., liquid) state (such as during injection molding or blow molding). During rotomolding, the powder particles (i) contact a heated surface of the mold, (ii) melt into a molten, or substantially molten, form, and (iii) fuse together to form a rotational molded article.

It is understood that rotational molding is distinct from blow molding, injection molding, and thermoforming.

In an embodiment, the rotational molding includes rotating a mold containing the blend in an oven at a temperature from 250° C., or 275° C., or 280° C., or 288° C. to 300° C., or 310° C., or 320° C., or 350° C.; and rotating the mold containing the blend in an oven fora duration of from 5 minutes, or 10 minutes, or 15 minutes, or 20 minutes to 25 minutes, or 30 minutes, or 40 minutes, or 45 minutes, or 60 minutes.

In an embodiment, the rotational molding includes obtaining a PIAT from 198° C., or 198.8° C., or 200° C., or 207° C. to 208° C., or 210° C., or 215° C., or 220° C., or 221.1° C., or 222° C. A PIAT that is less than 198° C. results in a rotational molded article that has not been fully processed. A PIAT that is higher than 222° C. may result in a rotational molded article with diminished physical properties because the polymeric material can degrade at temperatures higher than 222° C.

After heating, the molten, or substantially molten, polymeric material (including the polyolefin, dispersant, and optional wax from the small powder and the ethylene/α-olefin copolymer of the large powder) is cooled such that the polymeric material solidifies to form a rotational molded article.

The rotational molding step may comprise two or more embodiments disclosed herein.

A "rotational molded article" is a hollow article composed of polymeric material and having a wall surrounding, or encasing, a void volume. The wall may or may not be continuous. In an embodiment, the wall is continuous. The wall composed of the polymeric material has two opposing surfaces, including an outer surface (mold contact surface) and an inner surface. When the rotational molded article is in the mold, the wall's outer surface is in contact with the mold surface. The wall's inner surface faces the void. In other words, the wall's inner surface is adjacent the void volume. In the completed rotational molded article, the wall's outer surface (mold contact surface) is exposed to the ambient environment and is the surface visible to users of the rotational molded article.

It is understood that a rotational molded article is not a blow molded article, an injection molded article, or a thermoformed article.

In an embodiment, the rotational molded article has a wall with a thickness from 0.8 mm, or 1.0 mm, or 3.0 mm to 5.0 mm, or 10 mm, or 15 mm, or 20 mm, or 25 mm. In another embodiment, the rotational molded article has a wall with a thickness from 0.8 mm to 25 mm, or from 0.8 mm to 10 mm, or from 1.0 mm to 10 mm.

The rotational molded article includes a gradient of ethylene/α-olefin copolymer (from the large powder) and polyolefin (from the small powder), with the polyolefin concentrated towards the outer surface of the rotational molded article and the ethylene/α-olefin copolymer concentrated towards the inner surface of the rotational molded article. Not wishing to be bound by any particular theory, it is believed that the gradient is caused by the smaller mean volume average particle size of the small powder (1-300 μm) relative to the large powder (325-4,000 μm), which allows the (A) small powder particles to move between (or fit between) the (B) large powder particles, towards the mold surface, during rotomolding. In other words, the small powder (containing, for example, the ethylene/α-olefin multi-block copolymer) moves towards the mold surface during rotomolding, resulting in a rotational molded article with an outer surface containing a majority amount of polyolefin from the small powder and an inner surface containing a majority amount of ethylene/α-olefin copolymer from the large powder. Consequently, the outer surface of the rotational molded article can be tailored (through the selection of specific polyolefin(s) in the small powder) to provide specific properties to the rotational molded article, such as increased grip or slip resistance, increased impact resistance, and/or differentiated haptics.

In an embodiment, the process includes moving the small powder towards the mold surface of a rotational molder during rotational molding.

The small mean volume average particle size of the small powder, from 1 μm to 300 μm, also enables the blend to fill small voids within the mold, such as in mold corners or in mold detailing.

In an embodiment, the outer surface of the rotational molded article has a higher static Coefficient of Friction (COF) than the inner surface of the rotational molded article. In other words, the outer surface of the rotational molded article exhibits increased grip or slip resistance compared to the inner surface of the rotational molded article. The outer surface of the rotational molded article has a greater static COF than the inner surface of the rotational molded article due to the higher concentration of polyolefin from the small powder at the outer surface of the rotational molded article (compared to the inner surface of the same rotational molded article).

In an embodiment, the outer surface of the rotational molded article has a higher kinetic COF than the inner surface of the rotational molded article. In other words, the outer surface of the rotational molded article exhibits increased grip or slip resistance compared to the inner surface of the rotational molded article.

In an embodiment, the process includes removing the rotational molded article from the mold.

In an embodiment, the process includes:
providing a blend containing, consisting essentially of, or consisting of:
(A) from 5 wt % to 20 wt %, or 30 wt % of a first powder (or small powder) containing, consisting essentially of, or consisting of, (i) an ethylene/α-olefin multi-block copolymer having a density from 0.860 g/cc, or 0.870 g/cc to 0.877 g/cc, or 0.880 g/cc, or 0.890 g/cc, and a melt index from 2 g/10 min, or 3 g/10 min, or 4 g/10 min, or 5 g/10 min to 6 g/10 min, or 7 g/10 min, or 10 g/10 min; (ii) from 1 wt % to 15 wt % of a dispersant selected from an acrylic dispersant, a poloxamer, and combinations thereof; (iii) optionally, an ethylene-based wax; the first powder having (a) a mean volume average particle size from 10 μm, or 20 μm, or 40 μm to 50 μm, or 60 μm, or 70 μm, or 100 μm, or 200 μm; (b) a sphericity from 0.92 to 1.0; (c) a particle size distribution from 1 to less than 2; (d) a particle density from 98% to 100%;
(B) a second powder (or a large powder) containing an ethylene/α-olefin copolymer (such as HDPE and/or MDPE) having (i) a density from 0.920 g/cc, or 0.930 g/cc, or 0.940 g/cc to 0.950 g/cc, or 0.955 g/cc; (ii) a melt index from 2 g/10 min, or 3 g/10 min, or 4 g/10 min, or 5 g/10 min to 6 g/10 min, or 7 g/10 min, or 10 g/10 min; the second powder having a mean volume average particle size from 400 μm, or 500 μm, or 600 μm to 700 μm, or 800 μm, or 900 μm, or 1,000 μm; and
rotational molding the blend to form a rotational molded article;
the rotational molded article having one, some, or all of the following properties: (i) an outer surface with a higher static COF than the inner surface of the rotational molded article; and/or (ii) an outer surface with a higher kinetic COF than the inner surface of the rotational molded article; and/or (iii) a wall with a thickness from 0.8 mm, or 1.0 mm, or 3.0 mm to 5.0 mm, or 10 mm, or 15 mm, or 20 mm, or 25 mm.

In an embodiment, the blend contains from 5 wt %, or 10 wt % to 15 wt % of the small powder and the rotational molded article has one, some, or all of the following properties: (i) the outer surface has a static COF from 0.270, or 0.280, or 0.285 to 0.300, or 0.400; and/or (ii) the inner surface has a static COF from 0.180, or 0.190, or 0.192 to 0.195, or 0.200, or 0.210; and/or (iii) the outer surface has a kinetic COF from 0.150, or 0.170, or 0.180, or 0.190 to 0.192, or 0.200, or 0.210; and/or (iv) the outer surface has a kinetic COF from 0.100, or 0.110, or 0.115 to 0.118, or 0.120, or 0.130, or 0.140.

In an embodiment, the blend contains from 15 wt %, or 20 wt % to 25 wt %, or 30 wt % of the small powder and the rotational molded article has one, some, or all of the following properties: (i) the outer surface has a static COF from 0.900, or 1.000, or 1.010, or 1.020 to 1.026, or 1.030, or 1.040; and/or (ii) the inner surface has a static COF from 0.100, or 0.150, or 0.200 to 0.202, or 0.250, or 0.300, or 0.400; and/or (iii) the outer surface has a kinetic COF from 0.500, or 0.600, or 0.700, or 0.800 to 0.830, or 0.834, or 0.850, or 0.900, or 1.000; and/or (iv) the outer surface has a kinetic COF from 0.100, or 0.110, or 0.115 to 0.118, or 0.120, or 0.130, or 0.140.

The process may comprise two or more embodiments disclosed herein.

The present disclosure also provides a rotational molded article produced by the present process.

Rotational Molded Article

The present disclosure provides a rotational molded article. The rotational molded article contains an ethylene/α-olefin copolymer having a density from 0.920 g/cc to 0.955 g/cc and a melt index from 1.0 g/10 min to 15 g/10 min; a polyolefin having a density from 0.860 g/cc to 0.910 g/cc, and a melt index from 1.5 g/10 min to 1,000 g/10 min; a dispersant selected from an acrylic dispersant, a poloxamer, and combinations thereof; and optionally, a polyolefin wax.

The ethylene/α-olefin copolymer, polyolefin, dispersant, and polyolefin wax may be any respective ethylene/α-olefin copolymer, polyolefin, dispersant, and polyolefin wax disclosed herein.

The rotational molded article may be any rotational molded article disclosed herein.

In an embodiment, rotational molded article contains (i) an ethylene/α-olefin copolymer having a density from 0.920 g/cc to 0.955 g/cc and a melt index from 1.0 g/10 min to 15 g/10 min; (ii) a polyolefin having a density from 0.860 g/cc to 0.910 g/cc, and a melt index from 1.5 g/10 min to 1,000 g/10 min; (iii) from 1 wt % to 15 wt % of a dispersant selected from an acrylic dispersant, a poloxamer, and combinations thereof; (iv) optionally, a polyolefin wax; and (iv) optionally, an additive, based on the combined weight of components (ii)-(iv) (i.e., the weight percent of the dispersant is based on the combined weight of the polyolefin, dispersant, optional polyolefin wax, and optional additive).

In an embodiment, the rotational molded article has one, some, or all of the following properties: (i) an outer surface with a higher static COF than the inner surface of the rotational molded article; and/or (ii) an outer surface with a higher kinetic COF than the inner surface of the rotational molded article; and/or (iii) a wall with a thickness from 0.8 mm, or 3.0 mm to 5.0 mm, or 25 mm.

The article is a rotational molded article. Nonlimiting examples of suitable rotational molded articles include playground equipment, storage bins or storage tanks, refuse containers, water softening tanks, tote bins, automotive parts, pool tables, toys, balls, cribs, mannequins, canoes, kayaks, helmets, furniture, traffic barricades, portable outhouses, and display cases.

The rotational molded article may comprise two or more embodiments disclosed herein.

By way of example, and not limitation, some embodiments of the present disclosure will now be described in detail in the following Examples.

EXAMPLES

Materials used in the examples are provided in Table 1 below.

TABLE 1

| Material/Description | Properties | Source |
| --- | --- | --- |
| RESILITY ™ XDPDB-3162 | ethylene/1-hexene copolymer; MDPE density = 0.940 g/cc; melt index (190° C./2.16 kg) = 6.0 g/10 min; Shore D = 58.5; Static COF = 0.191; Kinetic COF = 0.173 | The Dow Chemical Company |
| INFUSE ™ 9500 | ethylene/1-octene multi-block copolymer; density = 0.877 g/cc; melting point = 122° C.; melt index (190° C./2.16 kg) = 5.0 g/10 min; Shore A = 69 | The Dow Chemical Company |
| ENGAGE ™ 8452 | ethylene/1-octene copolymer; polyolefin elastomer density = 0.875 g/cc; melting point = 66° C.; Shore A = 74; melt index (190° C./2.16 kg) = 3.0 g/10 min | The Dow Chemical Company |
| ENGAGE ™ 8137 | ethylene/1-octene copolymer; polyolefin elastomer density = 0.864 g/cc; melting point = 56° C.; Shore A = 63 melt index (190° C./2.16 kg) = 13 g/10 min | The Dow Chemical Company |
| PLURONIC ™ F-108 | poloxamer dispersant; ethylene oxide/propylene oxide block copolymer; 80 wt % ethylene oxide*; 20 wt % propylene oxide*; melting point = 57° C.; Mw = 14,600 g/mol; solid | BASF Corporation |
| LICOCENE ™ P E MA 4351 | maleic anhydride grafted polyethylene wax; density = 0.99 g/cc; drop point = 123° C.; acid value = 45 mg KOH/g; melt viscosity at 140° C. = 200-500 mPa · s | Clariant |

*Based on total weight of the dispersant?

Preparation of a Small Powder

Small Powder A—Containing Ethylene/1-Octene Multi-Block Copolymer

The Small Power A containing ethylene/1-octene multi-block copolymer (INFUSE™ 9500) is prepared by isolating a powder from an aqueous dispersion. Small powders having a mean volume average particle size of 49.4 μm (Small Powder $A^{50}$), 20 μm (Small Powder $A^{20}$), and 90 μm (Small Powder $A^{90}$) are prepared in the same manner. The preparation of Small Powder $A^{50}$ is as follows.

Aqueous dispersion is prepared using the BLUEWAVE™ extruder process of The Dow Chemical Company. The aqueous dispersion is prepared using a 25 mm Berstorff™ twin-screw extruder with 12 equally divided zones. Zone A/B indicates that there are 2 inlets in a zone, with "A" being the inlet closer to the feed throat. The INFUSE™ 9500 is added to the extruder as a pellet through a large Schenk™ feeder that drops into a feed throat. The Licocene™ PE MA 4351 and Pluronic™ F-108 are added to the extruder as a pellet or powder using a KQX K-Tron™ feeder that also drops into the feed throat. The initial water is added to the extruder via a 500D ISCO™ pump through an injector (with a pin) that is located in Zone 4B. The base (dimethylethanolamine (DMEA), from Fisher Scientific) is utilized to provide 140% neutralization. The base is added to the extruder via a 500D ISCO™ pump that is connected with the initial water. The base enters the extruder through Zone 4B. Finally, dilution water is delivered via a large Hydracell™ pump through an injector that is placed in Zone 8A. The extrusion conditions are provided in Table 2.

TABLE 2

| INFUSE™ 9500 Feed Rate (g/min) | Pluronic™ F-108 Feed Rate (g/min) | Licocene™ PE MA 4351 Feed Rate (g/min) | DMEA Base Feed Rate (mL/min) | Extruder Temp. in Zone 3 (° C.) | Extruder Speed (rpm) | Extruder Pressure in Zone 12 (psi) | Solids Content of Dispersion After Dilution (wt %) |
|---|---|---|---|---|---|---|---|
| 55.72 | 6.88 | 6.88 | 0.4 | 180 | 450 | 250 | 40 |

To isolate the small powder, the aqueous dispersion is diluted with water to 10 wt % solids, particles are allowed to float to the top of the aqueous dispersion for 2 hours, and the particles are then skimmed and filtered using vacuum filtration. The filtered particles are rinsed with water to form the small powder. The small powder is allowed to dry through vacuum or air drying at room temperature (23° C.). Flow aid is added (1 wt % AEROSIL™ R-972 fumed silica, available from Evonik Industries) by adding the small powder and flow aid to a speed mixer cup and mixing at 3500 rotations per minute (rpm) for 15 seconds in a Flack-Tek™ dual axis mixer.

Each Small Powder A (i.e., $A^{20}$, $A^{50}$, and $A^{90}$) contains 80 wt % INFUSE™ 9500, 10 wt % Pluronic™ F-108, and 10 wt % Licocene™ PE MA 4351, based on the total weight of the respective Small Powder A. The Small Powder $A^{50}$ has a mean volume average particle size of 49.4 μm, a sphericity of 0.94, a particle size distribution of 1.8, a particle density of greater than 99%, a D10 particle size of 11.2 μm, and a D90 particle size of 112.8 μm. The Small Powder A is not pigmented.

Small Powders B and C—Containing Polyolefin Elastomer

The Small Powers B and C containing ethylene elastomer (ENGAGE™ 8452 and ENGAGE™ 8137, respectively) are prepared in the same manner of Small Powder A, except Small Powder B contains ENGAGE™ 8452 instead of INFUSE™ 9500, and Small Powder C contains ENGAGE™ 8137 instead of INFUSE™ 9500.

Small Powder B contains 80 wt % ENGAGE™ 8452, 10 wt % Pluronic™ F-108, and 10 wt % Licocene™ PE MA 4351, based on the total weight of the Small Powder B. The Small Powder B has a mean volume average particle size of 50 μm.

Small Powder C contains 80 wt % ENGAGE™ 8137, 10 wt % Pluronic™ F-108, and 10 wt % Licocene™ PE MA 4351, based on the total weight of the Small Powder C. The Small Powder C has a mean volume average particle size of 50 μm.

Large Powders

Large Powder A

Large Powder A contains ethylene/hexene copolymer (RESILITY™ XDPDB-3162) and 0.5 wt % green pigment (based on the total weight of the Large Powder A). The Large Powder A has a mean volume average particle size of 700 μm.

Large Powder B

Large Powder B contains ethylene/hexene copolymer (RESILITY™ XDPDB-3162) and 0.5 wt % green pigment (based on the total weight of the Large Powder B). The Large Powder B has a mean volume average particle size of 550 μm.

Providing a Blend

A Rotoline Lab™ 0.50 rotational molding machine (rotomolder) is equipped with a mold having a body and a lid. The mold is in the shape of a cube with the following dimensions: 305 mm×305 mm×305 mm for Samples 1-2, and 177.8 mm×177.8×177.8 mm for Samples 3-10 and CS 11. The mold has grip and slip resistance on the exterior surface, and a smooth inner surface (i.e., mold surface). A cloth is soaked in silicone-based mold release and used to apply a thin, even coating of the silicone-based mold release to the inner surface of the mold, including the mold body and the mold lid. No visible drops or smears of silicone-based mold release are visible. The silicone-based mold release is cooked into the mold during a 6 minute pre-heat of the mold at a 288° C. oven temperature.

The Small Powder A containing ethylene/1-octene multi-block copolymer (INFUSE™ 9500) is loaded into the warm mold to contact the mold's inner surface. Immediately after the Small Powder A is loaded into the mold, Large Powder A or Large Powder B is loaded into the mold by pouring the large powder on top of the Small Powder A, forming a blend.

A second blend is prepared in the same manner with Small Powder B and Large Powder A; and a third blend is prepared with Small Powder C and Large Powder A. The second and third blends are rotational molded in the mold having the dimensions 177.8 mm×177.8×177.8 mm.

Rotational Molding the Blend

The mold containing the blend is closed and the cook cycle is initiated. The blend is processed at a 288° C. oven temperature and a 4:1 rotation ratio, where the major axis is rotated at a speed of 4 rpm and the minor axis is rotated at a speed of 1 rpm. The cook time is 22 minutes, followed by 6 minutes of air cooling, then 4 minutes of water mist with air cooling, and then 4 minutes of air cooling. A peak internal air temperature (PIAT) of 207° C. is achieved during the rotomolding process, as measured with a Paladin Sales EX Logger.

A rotational molded article is produced. The rotational molded article is hollow with a wall surrounding a void volume. The wall has two opposing surfaces, including an outer surface and an inner surface. The outer surface of the rotational molded article is the surface that is in contact with the inner surface of the mold. The rotational molded article is in the shape of the mold (i.e., a 305 mm×305 mm×305 mm cube or 177.8 mm×177.8×177.8 mm cube). The rotational molded article is removed from the mold. The rotational molded article is cut with a razor blade and a cross-section of the rotational molded article is viewed.

The composition and properties of each sample are provided in Table 3.

Results

Not wishing to be bound by any particular theory, it is believed that the smaller mean volume average particle size of the Small Powder $A^{50}$ (49.4 μm) relative to the Large Powder A (700 μm) allows the Small Powder particles to move between (or fit between) the Large Powder particles towards the mold's inner surface during rotomolding. Thus, the Small Powder $A^{50}$ is concentrated near the mold's inner surface during rotomolding. This yields a rotational molded article where the outer surface's COF is greater than the inner surface's COF for improved haptics, while still maintaining suitable impact strength.

The concentrated presence of INFUSE™ 9500 towards the outer surface of Sample 1 is shown by (i) the outer surface of Sample 1 having a higher Static COF (0.285) compared to its inner surface (0.192) and (ii) the outer surface of Sample 1 having a higher Kinetic COF (0.192) compared to its inner surface (0.118). The outer surface of Sample 1 thus exhibits increased grip, or slip resistance, compared to its inner surface.

The presence of non-pigmented material gradually decreases towards the inner surface of the rotational molded article. The visual gradient demonstrates the behavior of the Small Powder $A^{50}$ containing INFUSE™ 9500 to move towards the mold's inner surface during rotomolding.

The samples containing (i) a blend of Small Powder B and Large Powder A and (ii) Small Powder C and Large Powder A each failed to stratify. Not wishing to be bound by any

TABLE 3

|  | Sample 1 | Sample 2 | Sample 3 | Sample 4 | Sample 5 | Sample 6 | Sample 7 | Sample 8 | Sample 9 | Sample 10 | CS 11 |
|---|---|---|---|---|---|---|---|---|---|---|---|
| Small Powder $A^{50}$ with INFUSE™ 9500 (g/wt %[1]) | 149.7 g 10 wt % | 299.37 g 20 wt % | — | — | — | 45 g 10 wt % | 91 g 20 wt % | 136 g 30 wt % | — | — | — |
| Small Powder $A^{20}$ with INFUSE™ 9500 (g/wt %[1]) | — | — | 45 g 10 wt % | 91 g 20 wt % | 136 g 30 wt % | — | — | — | — | — | — |
| Small Powder $A^{90}$ with INFUSE™ 9500 (g/wt %[1]) | — | — | — | — | — | — | — | — | 45g 10 wt % | 91g 20 wt % | — |
| Large Power A with RESILITY™ XDPDB-3162 (g/wt %[1]) (700 μm) | 1347 g 90 wt % | 1197.48 g 80 wt % | — | — | — | — | — | — | — | — | — |
| Large Powder B with RESILITY™ XDPDB-3162 (g/wt %[1]) (550 μm) | — | — | 409 g 90 wt % | 363 g 80 wt % | 318 g 70 wt % | 409 g 90 wt % | 363 g 80 wt % | 318 g 70 wt % | 409 g 90 wt % | 363 g 80 wt % | 454 g 100 wt % |
| Blend Total (g/wt %[1]) | 1496 g 100 wt % | 1197.48 g 100 wt % | 454 g 100 wt % | 454 g 100 wt % | 454 g 100 wt % | 454 g 100 wt % | 454 g 100 wt % | 454 g 100 wt % | 454 g 100 wt % | 454 g 100 wt % | 454 g 100 wt % |
| Article Wall Thickness (mm) | 3.175 | 3.175 | 2.478 | 2.523 | 2.49 | 2.463 | 2.52 | 2.442 | 2.627 | 2.448 | 2.562 |
| Outer Surface Static Coefficient of Friction | 0.285 | 1.026 | 0.49 | 0.646 | 0.578 | 0.995 | 0.936 | 0.947 | 0.383 | 0.716 | 0.192 |
| Inner Surface Static Coefficient of Friction | 0.192 | 0.202 | 0.574 | 0.528 | 0.526 | 0.266 | 0.265 | 0.323 | 0.489 | 0.538 | 0.178 |
| Outer Surface Kinetic Coefficient of Friction | 0.192 | 0.834 | 0.429 | 0.604 | 0.484 | 0.914 | 0.882 | 0.892 | 0.315 | 0.598 | 0.156 |
| Inner Surface Kinetic Coefficient of Friction | 0.118 | 0.115 | 0.455 | 0.45 | 0.47 | 0.236 | 0.214 | 0.266 | 0.412 | 0.542 | 0.143 |

[1]Based on the total weight of the blend.
CS = Comparative Sample

The concentrated presence of INFUSE™ 9500 towards the outer surface of Sample 2 is shown by (i) the outer surface of Sample 2 having a higher Static COF (1.026) compared to its inner surface (0.202) and (ii) the outer surface of Sample 2 having a higher Kinetic COF (0.834) compared to its inner surface (0.115). The outer surface of Sample 2 thus exhibits increased grip, or slip resistance, compared to its inner surface.

Additionally, Sample 1 and Sample 2 each exhibits a color gradient from the outer surface to the inner surface of the rotational molded article. Specifically, there is a visual gradient of non-pigmented material that is concentrated towards the outer surface of the rotational molded article.

particular theory, it is believed that the low melting point (less than 95° C.) of the ethylene elastomer (ENGAGE™ 8452 and the ENGAGE™ 8137) resulted in the respective small powder melting early in the rotational molding cycle and concentrating near the mold surface. Thus, Small Powder B and Small Powder C are unsuitable for rotational molding applications.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A process comprising:
providing a blend comprising
(A) a first powder comprising
(i) a polyolefin that is an ethylene/α-olefin multi-block copolymer consisting of (i) ethylene and (ii) a $C_4$-$C_8$ α-olefin, and having a density from 0.860 g/cc to 0.910 g/cc, and a melt index from 1.5 g/10 min to 1,000 g/10 min;
(ii) from 1 wt % to 15 wt % of a dispersant selected from the group consisting of an acrylic dispersant, a poloxamer, and combinations thereof,
(iii) optionally, a polyolefin wax;
the first powder having a mean volume average particle size from 1 μm to 300 μm;
(B) a second powder comprising an ethylene/α-olefin copolymer having
(i) a density from 0.920 g/cc to 0.955 g/cc;
(ii) a melt index from 1.0 g/10 min to 15 g/10 min;
the second powder having a mean volume average particle size from 325 μm to 4,000 μm; and
rotational molding the blend to form a rotational molded article.

2. The process of claim 1 comprising:
first, contacting the first powder with a pre-heated mold surface of a rotational molder; and
subsequently, contacting the second powder with the first powder to form the blend in the rotational molder.

3. The process of claim 1 comprising:
first, contacting the first powder with a pre-heated mold surface of a rotational molder; and
subsequently, contacting the second powder with the first powder to form the blend in the rotational molder, wherein the rotational molder is not rotated before contacting the second powder with the first powder.

4. The process of claim 1 comprising stratifying the first powder towards a mold surface of a rotational molder during rotational molding.

5. The process of claim 1 comprising contacting the second powder with the first powder while the first powder is in a substantially solid form.

6. The process of claim 1 comprising forming a rotational molded article with an outer surface and an inner surface, wherein the outer surface has a higher static coefficient of friction than the inner surface.

7. A process comprising:
providing a blend comprising
(A) a first powder comprising
(i) a polyolefin having a density from 0.860 g/cc to 0.910 g/cc, and a melt index from 1.5 g/10 min to 1,000 g/10 min;
(ii) from 1 wt % to 15 wt % of a dispersant selected from the group consisting of an acrylic dispersant, a poloxamer, and combinations thereof,
(iii) optionally, a polyolefin wax;
the first powder having
(a) a mean volume average particle size from 10 μm to 300 μm;
(b) a sphericity from 0.92 to 1.0;
(c) a particle size distribution from 1 to 10; and
(d) a particle density from 98% to 100%;
(B) a second powder comprising an ethylene/α-olefin copolymer having
(i) a density from 0.920 g/cc to 0.955 g/cc;
(ii) a melt index from 1.0 g/10 min to 15 g/10 min;
the second powder having a mean volume average particle size from 325 μm to 4,000 μm; and
rotational molding the blend to form a rotational molded article.

8. The process of claim 7 comprising providing a blend comprising from 5 wt % to 30 wt % of the first powder.

9. A rotational molded article produced by the process of claim 1.

10. A rotational molded article comprising:
an ethylene/α-olefin copolymer having a density from 0.920 g/cc to 0.955 g/cc and a melt index from 1.0 g/10 min to 15 g/10 min;
a polyolefin that is an ethylene/α-olefin multi-block copolymer consisting of (i) ethylene and (ii) a $C_4$-$C_8$ α-olefin, and having a density from 0.860 g/cc to 0.910 g/cc, and a melt index from 1.5 g/10 min to 1,000 g/10 min;
a dispersant selected from the group consisting of an acrylic dispersant, a poloxamer, and combinations thereof; and
optionally, a polyolefin wax;
the rotational molded article is a hollow article comprising a wall surrounding a void volume, wherein the wall has two opposing surfaces including an inner surface facing the void volume and an outer surface, and the outer surface has at least one of (i) a higher static coefficient of friction or (ii) a higher kinetic coefficient of friction than the inner surface.

11. The rotational molded article of claim 10 wherein the wall has a thickness from 0.8 mm to 25 mm.

12. The rotational molded article of claim 10, wherein the outer surface has a higher static coefficient of friction than the inner surface.

13. The rotational molded article of claim 10, wherein the outer surface has a higher kinetic coefficient of friction than the inner surface.

14. The rotational molded article of claim 10 wherein the dispersant is the poloxamer.

15. The rotational molded article of claim 10 wherein the dispersant is the acrylic dispersant.

16. The process of claim 1, wherein the first powder has a mean volume average particle size from 1 μm to 100 μm.

17. The rotational molded article of claim 12, wherein the outer surface has a higher kinetic coefficient of friction than the inner surface.

* * * * *